(12) United States Patent
Fiul (10) Patent No.: US 8,843,594 B2
(45) Date of Patent: Sep. 23, 2014

(54) TIME SHIFTED TRANSCODED STREAMING (TSTS) SYSTEM AND METHOD

(76) Inventor: Dan Fiul, Springfield, VA (US)

( * ) Notice: Subject to any disclaimer, the term of this patent is extended or adjusted under 35 U.S.C. 154(b) by 464 days.

(21) Appl. No.: 12/659,960

(22) Filed: Mar. 26, 2010

(65) Prior Publication Data

US 2011/0238788 A1 Sep. 29, 2011

(51) Int. Cl.
| | | |
|---|---|---|
| G06F 15/16 | (2006.01) | |
| H04N 21/434 | (2011.01) | |
| H04N 21/2343 | (2011.01) | |
| H04N 21/262 | (2011.01) | |
| H04N 21/44 | (2011.01) | |
| H04N 21/2365 | (2011.01) | |

(52) U.S. Cl.
CPC ..... *H04N 21/23439* (2013.01); *H04N 21/4347* (2013.01); *H04N 21/26275* (2013.01); *H04N 21/44004* (2013.01); *H04N 21/2365* (2013.01)
USPC ............ 709/219; 709/203; 709/231; 709/248

(58) Field of Classification Search
USPC ........................................................ 709/219
See application file for complete search history.

(56) References Cited

U.S. PATENT DOCUMENTS

| | | | | |
|---|---|---|---|---|
| 6,108,560 | A * | 8/2000 | Navaro et al. ................. | 455/517 |
| 7,305,211 | B2 * | 12/2007 | Dent ............................ | 455/12.1 |
| 7,818,445 | B2 * | 10/2010 | Zuckerman et al. .......... | 709/231 |
| 7,830,800 | B1 * | 11/2010 | Masterson et al. ............ | 370/232 |
| 7,864,808 | B2 * | 1/2011 | Krause et al. ................. | 370/486 |
| 7,904,187 | B2 * | 3/2011 | Hoffberg et al. ................ | 700/83 |
| 7,920,824 | B2 * | 4/2011 | Janik et al. .................... | 455/3.02 |
| 7,961,665 | B2 * | 6/2011 | Kimmich et al. ............. | 370/316 |
| 7,966,642 | B2 * | 6/2011 | Nair et al. ..................... | 725/142 |
| 8,001,261 | B2 * | 8/2011 | Katis et al. .................... | 709/231 |
| 8,060,609 | B2 * | 11/2011 | Banger et al. ................. | 709/225 |
| 2004/0031058 | A1 * | 2/2004 | Reisman ....................... | 725/112 |
| 2005/0210101 | A1 * | 9/2005 | Janik ............................. | 709/203 |
| 2005/0276284 | A1 * | 12/2005 | Krause et al. ................. | 370/538 |
| 2007/0101378 | A1 * | 5/2007 | Jacobs ........................... | 725/90 |
| 2007/0106811 | A1 * | 5/2007 | Ryman ......................... | 709/230 |
| 2008/0207182 | A1 * | 8/2008 | Maharajh et al. ........... | 455/414.1 |
| 2009/0003563 | A1 * | 1/2009 | Katis et al. ................... | 379/93.15 |
| 2009/0013414 | A1 * | 1/2009 | Washington et al. .......... | 726/32 |
| 2009/0201988 | A1 * | 8/2009 | Gazier et al. ............ | 375/240.06 |
| 2009/0319845 | A1 * | 12/2009 | Liu et al. ....................... | 714/747 |
| 2009/0320073 | A1 * | 12/2009 | Reisman ........................ | 725/51 |
| 2010/0054327 | A1 * | 3/2010 | Capless ................... | 375/240.01 |
| 2010/0095012 | A1 * | 4/2010 | Zuckerman et al. ......... | 709/231 |
| 2010/0205628 | A1 * | 8/2010 | Davis et al. .................... | 725/25 |
| 2010/0274816 | A1 * | 10/2010 | Guzik .......................... | 707/802 |
| 2010/0322592 | A1 * | 12/2010 | Casagrande ................. | 386/241 |
| 2011/0055420 | A1 * | 3/2011 | Zuckerman et al. ......... | 709/231 |
| 2011/0099571 | A1 * | 4/2011 | Lucas ............................ | 725/19 |
| 2011/0103769 | A1 * | 5/2011 | Risan ........................... | 386/252 |
| 2011/0107379 | A1 * | 5/2011 | Lajoie et al. ................... | 725/87 |
| 2011/0197237 | A1 * | 8/2011 | Turner .......................... | 725/78 |
| 2011/0302604 | A1 * | 12/2011 | Halen et al. ................... | 725/38 |

* cited by examiner

*Primary Examiner* — Melvin H Pollack
(74) *Attorney, Agent, or Firm* — Dan Fiul (57) ABSTRACT

A method and system for transmitting multimedia content from a server to a client device includes a source multimedia retriever to retrieve source multimedia content data. A transcoded multimedia retriever retrieves transcoded multimedia content data, the transcoded multimedia content data being a transcoded version of the source multimedia content, and the transcoded multimedia content data being time shifted with respect to the source multimedia content data. A data packet formulator formulates a data packet comprising the source multimedia content data and the time shifted transcoded multimedia content data. A data packet transmitter transmits the data packet from the server to the client device.

20 Claims, 7 Drawing Sheets

TIME SHIFTED TRANSCODED STREAMING (TSTS) SYSTEM AND METHOD

BACKGROUND OF THE INVENTION

1. Field of the Invention

This invention relates generally to streaming of multimedia content. More particularly, it relates to time shifted transcoded multimedia streaming of multimedia content.

2. Background

Multimedia streaming is becoming more and more common with the advent of faster and faster data connections. However, even as data connections, such as the Internet, cable providers, satellite providers, etc., become faster, uninterrupted review of multimedia content (as defined throughout this specification can include any of video only content, audio only content, and a combination of video/audio content etc.) streamed from a server has not been attained for most users.

For example, review of streamed Internet multimedia content is subject to any of a number of impediments. The speed of a source server, the speed of a data connection, the processing speed of a receiving data client, traffic on a shared data connection, etc. are all potential impediments to uninterrupted review of streamed multimedia content.

Everyone has experienced interrupted multimedia streaming. For example, when viewing multimedia content on YouTube, users frequently experience interruptions. A multimedia streaming interruption most commonly results in a message being displayed on a client device that multimedia content is being buffered and for the user to wait until multimedia viewing can recommence. During buffering, a user is forced to simply stare at the screen until multimedia viewing can recommence, resulting in extreme frustration for a user of the client device.

Figure 5:
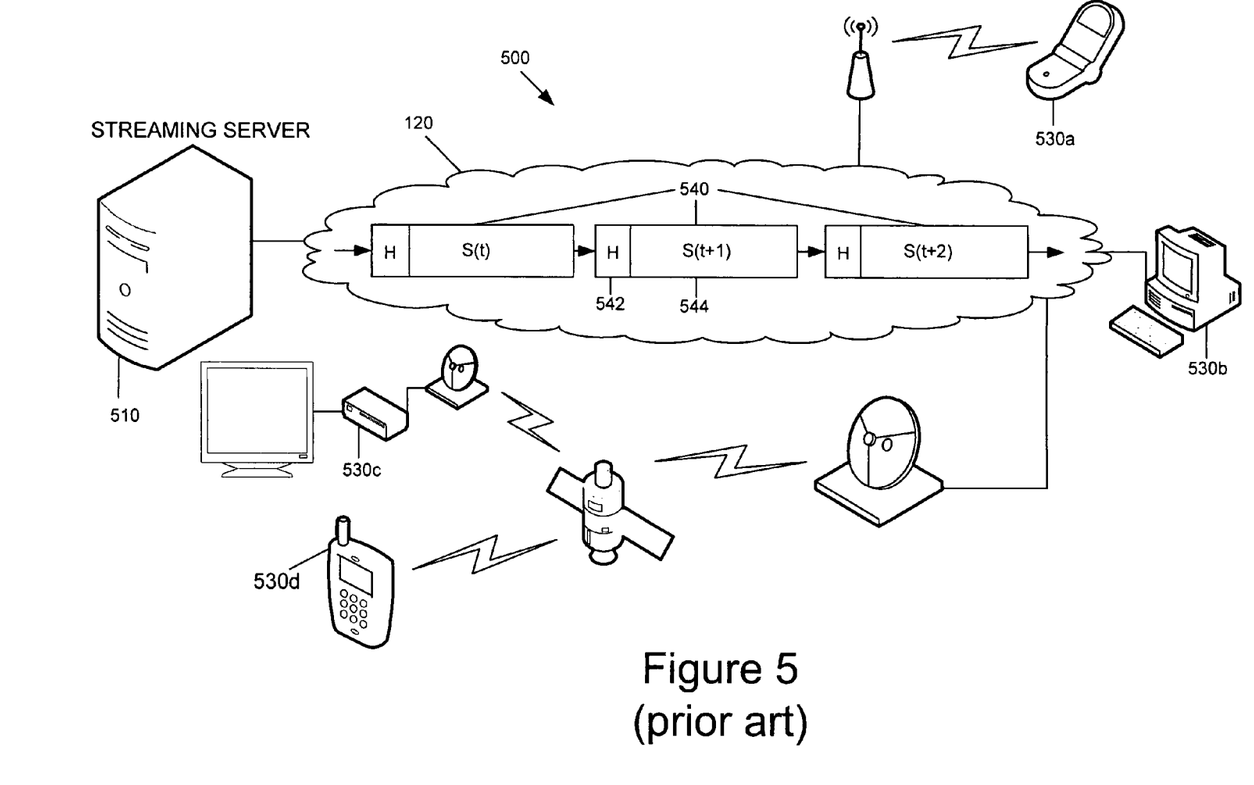
FIG. 5 shows a conventional system for streaming multimedia content to a data client.

FIG. 5 shows a conventional system for streaming multimedia content to a data client. In particular, the conventional system 500 for streaming multimedia content to a data client includes a streaming server 510, a data network 120, a plurality of data clients 530a-530d, collectively and individually described herein as data client 530. Data clients 530a-530d can include any of a variety of digital data devices, such as a cellular telephone 530a, a personal computer 530b, a satellite television receiver 530c, a satellite radio receiver 530d, etc. Although not shown for simplicity purposes, data clients 530 can include data network connected Blu-Ray players, data network connected video game systems, data network connected televisions, data network connected cable television receivers, etc.

In response to a data client 530 request for multimedia content or as a broadcast of multimedia content, streaming server 510 formulates multimedia data packets 540. A multimedia data packet 540 typically includes a header portion 542 and a payload portion 544. For requested multimedia content, the header portion 542 conventionally includes an address of the requesting data client 530. The payload portion 544 of multimedia data packet 540 includes the multimedia content.

For a satellite radio broadcast, the payload portion 544 includes audio only multimedia content. For a video broadcast, the payload portion 544 includes both video and matching audio content. For either type of multimedia content, successive data packets 540 are formulated by streaming server 510 that include the multimedia content. The successive data packets 540 provide chronologically ordered segments of multimedia content that, once reassembled at a receiving data client 530, form a stream of multimedia content that can be enjoyed by a user of the data client 530. If the bandwidth of the streaming server 540, the data network 120, and/or the data client 530 is adequately high enough, a user will experience an uninterrupted multimedia streaming experience. However, in many instances the user is not so fortunate.

Figure 6:
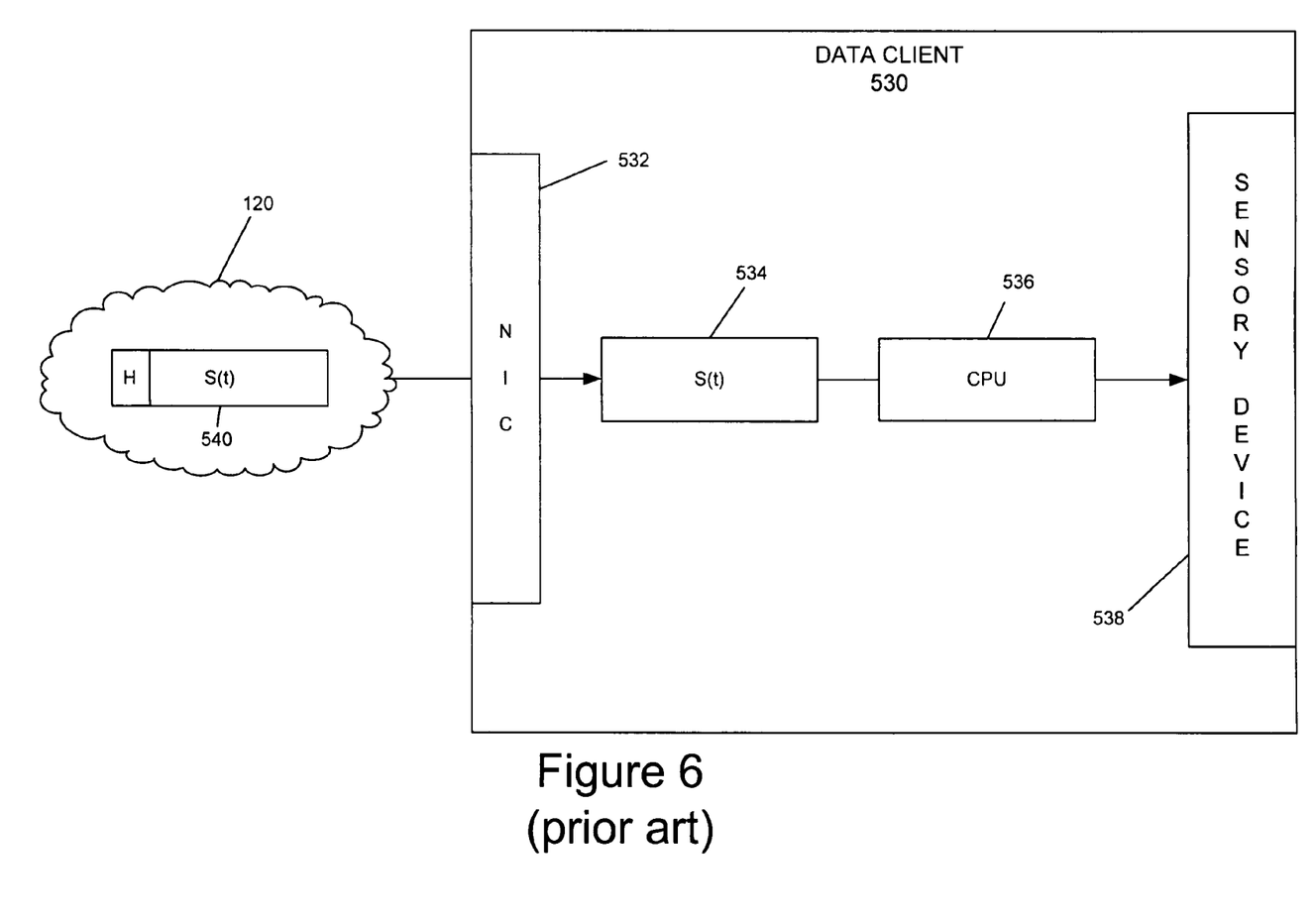
FIG. 6 shows a conventional data client for reviewing streaming multimedia content.

FIG. 6 shows a conventional data client for reviewing streaming multimedia content. In particular, the data client 530 includes a network interface card 532, a multimedia buffer 534, a central processing unit (CPU) 536, and a sensory device 538.

Data client 530 receives a plurality of data packets 540 through a network interface card (NIC) 532. The headers of the data packets 540 are stripped off and the payload is recorded in the multimedia buffer 534.

The CPU 536 transfers the streaming content from multimedia buffer 534 to an output device, e.g., the sensory device 538. For review of video multimedia content, sensory device 538 can be conventionally connected to a video display device to allow review of the multimedia content being streamed from multimedia buffer 534. Likewise, if the multimedia content is audio, the CPU 536 transfers the streaming content from multimedia buffer to a sound card (not shown) for conversion to an analog form for listening on a speaker (not shown).

The multimedia buffer 534 is used to collect streaming content from data packets 540 in advance of a user reviewing the streaming content. However, as discussed above, for any of a number of reasons the streaming buffer 534 may become empty, i.e., may run out of streaming content, which results in interruptions to the steaming of multimedia content to the data client 530.

There is a need for an apparatus and method which allows for uninterrupted or reduced interruption review of multimedia content. This would provide a user of a client device an improved multimedia experience.

SUMMARY OF THE INVENTION

In accordance with the principles of the present invention, a method and system for transmitting multimedia content from a server to a client device includes a source multimedia retriever to retrieve source multimedia content data. A transcoded multimedia retriever retrieves transcoded multimedia content data, the transcoded multimedia content data being a transcoded version of the source multimedia content, and the transcoded multimedia content data being time shifted with respect to the source multimedia content data. A data packet formulator formulates a data packet comprising the source multimedia content data and the time shifted transcoded multimedia content data. A data packet transmitter transmits the data packet from the server to the client device.

In accordance with the principles of the present invention, a method and system for receiving multimedia content from a server at a client device includes a data packet receiver to receive, from the server, a data packet, the data packet comprising source multimedia content data and transcoded multimedia content data, the transcoded multimedia content data being a transcoded version of the source multimedia content data, and the transcoded multimedia content data being time shifted with respect to the source multimedia content data. A data buffer buffers, within the client device, the source multimedia content data and the transcoded multimedia content data. A multimedia streamer streams the source multimedia content data to a sensory device if the source multimedia content data is available within the data buffer of the client device, and to stream the transcoded multimedia content data to the sensory device if the source multimedia content data is unavailable within the data buffer of the client device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides for an uninterrupted multimedia experience. A Time Shifted Transcoded Streaming (TSTS) system includes a TSTS server than can provide redundant multimedia content to a client device. The redundant multimedia content is provided to a client device in the form of transcoded multimedia content of a lower quality than multimedia content from which it corresponds. The transcoded multimedia content is streamed at a staggered time, i.e., time shifted, relative to the streaming of the multimedia content from which it corresponds. A payload of a data packed used to stream the multimedia content can contain both the transcoded multimedia content and the multimedia content from which it corresponds.

Once a data packet is received, a client device can populate two multimedia buffers. A first multimedia buffer can store transcoded multimedia content and a second multimedia buffer can store source multimedia content ("S"), i.e., multimedia content from which the transcoded multimedia content ("T") corresponds to but is of a high quality.

As discussed above, an interruption to the review of multimedia content typically results in a user having to wait while a single multimedia buffer is replenished with multimedia content. However, in accordance with the principles disclosed herein, a client device can access the transcoded multimedia buffer disclosed herein to prevent an interruption in the multimedia experience of a user. Although the transcoded multimedia content is of a lower quality relative to the multimedia content from which it corresponds, having even a lower quality multimedia content prevents interruption to a multimedia review experience. And because the transcoded multimedia content is of a lower quality, the impact on the bandwidth available to transmit the source multimedia content is minimized.

Described throughout the embodiments disclosed herein are the source multimedia content S data and the transcoded multimedia content T data. The source multimedia content S data itself may be a transcoded version of another multimedia content. In accordance with the principles disclosed herein, the source multimedia content S is defined as being a higher quality version of the transcoded multimedia content T. Alternately, the source multimedia content S can be a highest quality version of multimedia content that is available, having never itself being transcoded to a lower quality.

Figure 1:
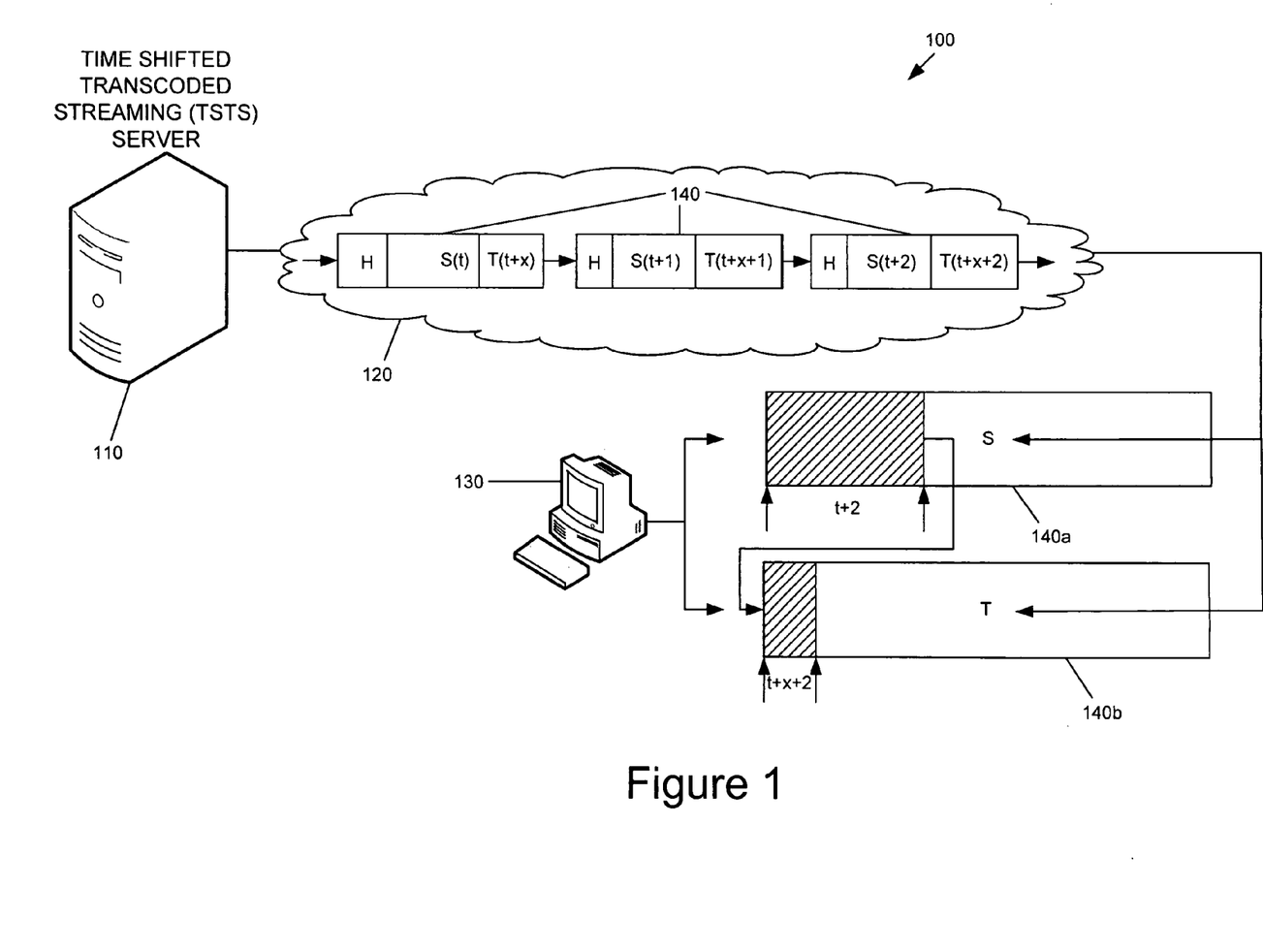
FIG. 1 shows a Time Shifted Transcoded Streaming (TSTS) system, in accordance with the principles of the present invention.

FIG. 1 shows a Time Shifted Transcoded Streaming (TSTS) system, in accordance with the principles of the present invention.

In particular, the Time Shifted Transcoded Streaming (TSTS) system 100 includes a Time Shifted Transcoded Streaming (TSTS) server 110, a data network 120, Time Shifted Transcoded Streaming (TSTS) data packets 140, and a Time Shifted Transcoded Streaming (TSTS) client device 130.

The Time Shifted Transcoded Streaming (TSTS) client device 130 can include two multimedia buffers, a first multimedia buffer 140a can store the source multimedia content S and the second multimedia buffer 140b can store the transcoded multimedia content T that is a transcoded version of the source multimedia content S stored in the first multimedia buffer 140a. The transcoded multimedia content T is time shifted with respect to the source multimedia content S by a time shift of "x". The amount of time shift x produces an x amount of time of transcoded content available in the event that the source multimedia content S is unavailable, for whatever reason.

For example, time shifting the transcoded multimedia content T with respect to the source multimedia content S by 4 seconds results in 4 seconds worth of transcoded multimedia content T being available in the event that the source multimedia content S becomes unavailable, for whatever reason. This 4 seconds worth of transcoded multimedia content T provides a second source of multimedia content that is available to prevent or minimize interruption to review of multimedia content by a user.

In a preferred embodiment, the transcoded multimedia content T in the second multimedia buffer 140b can be continuously added to and simultaneously purged to store a constant amount of transcoded multimedia content T, e.g., constantly providing 4 seconds worth of transcoded multimedia content T. Although depending upon the application and probably of delay, more or less amount of transcoded multimedia content T can be stored. Storage of a constant amount of transcoded multimedia content T minimizes the impact of the transmission TSTS data packet 140 disclosed herein on the bandwidth available within the data network 120 for transmission of the source multimedia content S.

In an alternate embodiment, the transcoded multimedia content T stored in the second multimedia buffer 140b can be continuously varied, added either more or less to and simultaneously purging the transcoded multimedia content T, e.g., varying according to parameters described herein that impact a multimedia experience of a user. Storage of a varying amount of transcoded multimedia content T maximized the amount of source multimedia content S available in the first multimedia buffer 140a.

Irrespective if the transcoded multimedia content T in the second multimedia buffer 140b remains constant or varies, the beginning of the transcoded multimedia content T in the second multimedia buffer 140b continuously tracks the end of the source multimedia content S stored in the first multimedia buffer 140a. In this manner, the client device 130 can switch from the first multimedia buffer 140a to the second multimedia buffer 140b as a source of multimedia content, and only experience a degrade in the quality of content without experiencing an interruption in the streaming flow of multimedia content.

The TSTS server 110 can formulate data packets 140 that include a payload portion that, in accordance with the principles disclosed herein, includes both the transcoded multimedia content T and the source multimedia content S from which the transcoded multimedia content T corresponds to. As will be described in more detail below with the description of FIG. 2, the transcoded multimedia content T and the source multimedia content S, that the transcoded multimedia content T corresponds to, are time shifted with respect to one another.

The data network 120 can be any data network that allows for data packets to be transmitted from the TSTS server 110 and the TSTS client device 130. The data network 120 can include any single data network or combination of the Internet, cellular data network, Wide Area Network (WAN), Local Area Network (LAN), telephone network, cable network, etc. The protocol used to transport data packets across the data network 120 can include, e.g., Transport Control Protocol (TCP)/Internet Protocol (IP) protocol, User Datagram Protocol (UDP) protocol, Hypertext Transfer Protocol (HTTP) protocol, etc. Any communication protocol that allows the formulation of a data packet to communicate the TSTS data packets 140 disclosed herein can be used with the embodiments disclosed herein.

The first multimedia buffer 140a can store the source multimedia content S. As such, the amount of data that is stored therein is greater than that which is stored in the second multimedia buffer 140b. To conserve memory space used by TSTS client device 130 for multimedia content, the amount of memory space reserved for the second multimedia buffer 140b is preferably much less than that that is reserved for the first multimedia buffer 140a.

As an example, the first multimedia buffer 140a and the second multimedia buffer 140b are shown as storing the three TSTS data packets 140 transported over data network 120. For example purposes only, the first multimedia buffer 140a and the second multimedia buffer 140b are both shown as storing two seconds worth of multimedia content. However, the two seconds worth of transcoded multimedia content T that is stored in the second multimedia buffer 140b is "x" seconds ahead of the source multimedia content S stored in the first multimedia buffer 140a. As the first multimedia buffer 140a becomes depleted, the amount of source multimedia content S will diminish relative to the amount of transcoded multimedia content T stored in the second multimedia buffer 140b. Two seconds of multimedia content is an arbitrary amount of multimedia content discussed for example purposes only, and can be greater or lesser depending upon streaming conditions.

Because the transcoded multimedia content T is a time shifted variant of the source multimedia content S and stored in advance of the source multimedia content S that is currently being reviewed at any given time, should the first multimedia buffer 140a run out of multimedia content for whatever reason, the TSTS client device 130 can switch to instead rely on transcoded multimedia content T from the second multimedia buffer 140b. The ability to pull transcoded multimedia content T from the second multimedia buffer 140b in the event that the first multimedia buffer 140a becomes depleted prevents an interruption in a user experience for reviewing multimedia content, even at the sake of being switched to a degraded version of the source multimedia content S. However, users prefer to have an uninterrupted multimedia experience, even at the expense of having to be switched to a degraded version of the source multimedia content S.

When enough source multimedia content S is buffered again in the first multimedia buffer 140a, the TSTS client device 130 can switch back to relying on the source multimedia content S from the first multimedia buffer 140a. Switching back and forth from the first multimedia buffer 140a and the second multimedia buffer 140b prevents an interruption in multimedia streaming.

Figure 2:
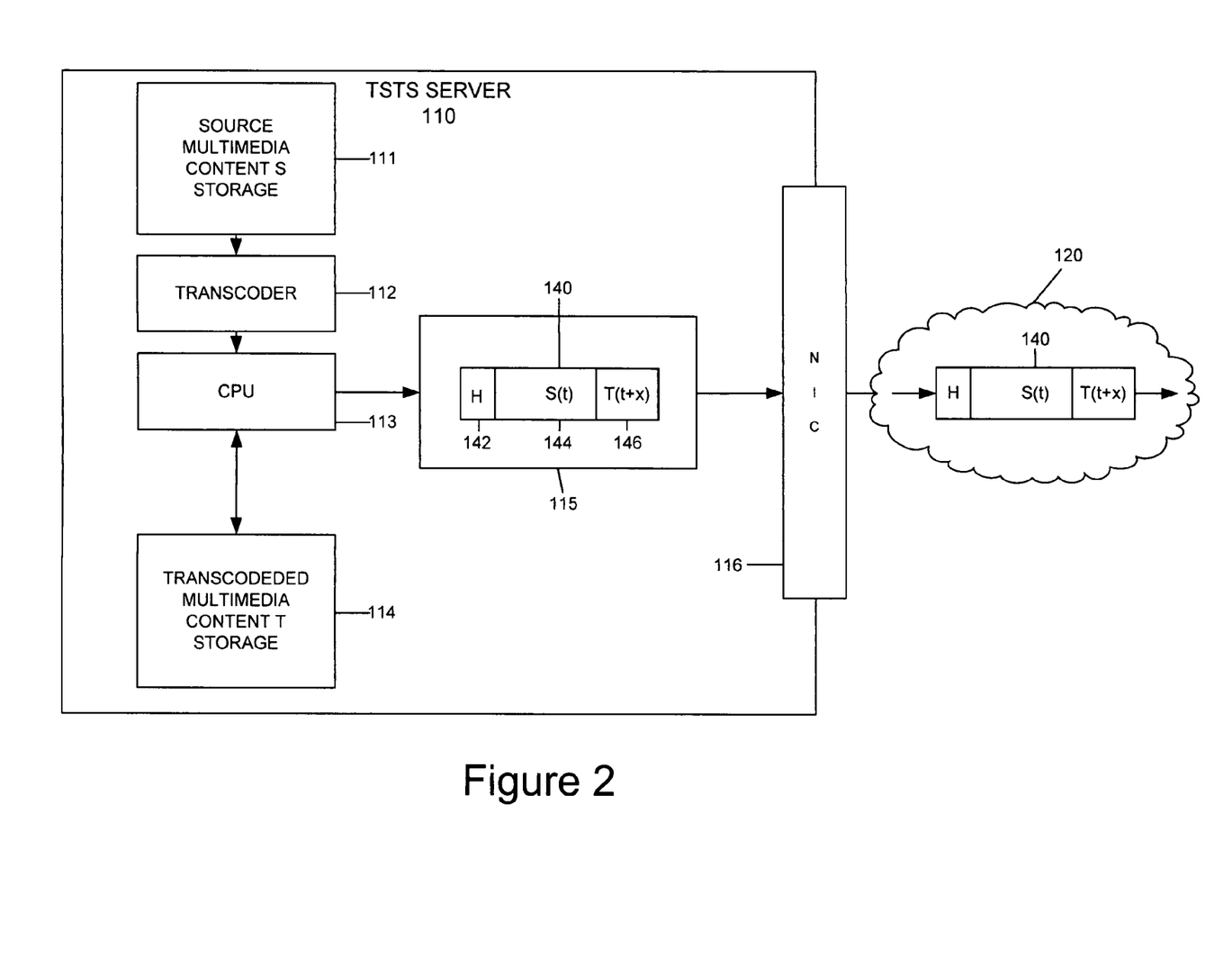
FIG. 2 shows a TSTS server, in accordance with the principles of the present invention.

FIG. 2 shows a TSTS server, in accordance with the principles of the present invention.

In particular, the TSTS server 110 includes a source multimedia content S storage 111, an optional transcoder 112, a central processing unit ("CPU") 113, a transcoded multimedia content T storage 114, an output buffer 115, and a network interface card ("NIC") 116.

The source multimedia content S storage 111 preferably stores source multimedia content S. Integrating the source multimedia content S storage 111 with the TSTS server 110 minimizes delays associated with accessing source multimedia content S from a remote location.

Alternately, the source multimedia content S storage 111 can be a remote storage that is preferably accessible over the data network 120. For example, the source multimedia content S storage 111 can include such storage sources as YouTube, Hulu, etc. As an intermediary server that performs the TSTS functions disclosed herein, the TSTS server 110 can act as a proxy server that allows access to source multimedia content S. For example, the TSTS server 110 can host a video portal web site. Users log onto this video portal web site to access their favorite video web sites, such as YouTube, Hulu, etc. Accessing their favorite video web sites through the TSTS server 110 acting as a proxy server, the user gains the benefits of the TSTS functionality disclosed herein.

The transcoder 112 can perform substantially real-time transcoding of content from the source multimedia content S storage 111 as the TSTS client device 130 accesses such content. Substantial real-time transcoding results in the transcoder 112 providing transcoded content directly to the CPU 113.

Alternately, content from the source multimedia content S storage 111 can be transcoded in advance of the TSTS client device 130 accessing such content. In this embodiment, the transcoder 112 performs transcoding of content from the source multimedia content S storage 111 for storage in the transcoded multimedia content T storage 114.

As a hybrid embodiment, the transcoder 112 can perform both substantially real-time transcoding of content from the source multimedia content S storage 111 and transcoding in advance of the TSTS client device 130 accessing such content. For example, once a request is received by the TSTS server 110 for content from the source multimedia content S storage 111, the transcoder 112 can perform substantially real-time transcoding for such requested content. During idle processing cycles for the CPU 113, the transcoder 112 can perform advance transcoding for the requested content for storage in the transcoded multimedia content T storage 114. As potentially having two sources for transcoded multimedia content T, the CPU 113 can access the transcoded multimedia content T storage 114 if such requested content was transcoded and stored in advance. Alternately, if such requested content was not transcoded and stored in advance, the transcoder 112 performs transcoding of source multimedia content S in substantially real-time, as described above. With this embodiment, the CPU 113 can first check for transcoded multimedia content T that may be stored in transcoded multimedia content T storage 114. If the transcoded multimedia content T is not found, the transcoder 112 is invoked to perform substantially real-time transcoding.

Whichever sources the CPU 113 accesses the source multimedia content S described above and the transcoded multimedia content T described above, the CPU 113 builds a TSTS data packet 140 in output buffer 115. As is known within the art of packetized data communications, the TSTS data packet 140 includes a header H 142. Header H 142 can detail where the source multimedia content S and the transcoded multimedia content T respectively start and end within the TSTS data packet 140. However, in accordance with the principles disclosed herein, the TSTS data packet's 140 payload that includes both source multimedia content S 114 and transcoded multimedia content T 146. In accordance with the principles disclosed herein, the transcoded multimedia content T 146 is time shifted with respect to the source multimedia content S 144 by a time shift of "x".

The NIC 116 allows the TSTS server 110 to communicate with the data network 120. The NIC 116 places the TSTS data packet 140 on the data network 120 for transmission to the TSTS client device 130.

Depending upon the degree of transcoding performed on a source multimedia content S, the ratio of data for transcoded multimedia content T to source multimedia content S can either be relatively large or relatively small. For higher degrees of transcoding, the relative size of transcoded multimedia content T to the size of source multimedia content can be very small and still be viewable. For higher degrees of transcoding producing small file sizes, in accordance with the principles disclosed herein, the transcoded multimedia content T 146 can be placed in fewer data packets leaving the TSTS server 110. Likewise, for lower degrees of transcoding producing larger file sizes, in accordance with the principles disclosed herein the transcoded multimedia content T 146 can be placed in every data packet leaving the TSTS server 110.

The TSTS server 110 can communicate with the TSTS client 130 to determine if the TSTS client 130 is having problems receiving a continuous stream of source multimedia content S. If so determined, the TSTS server 110 can switch on inclusion of the transcoded multimedia content T 146 within a TSTS data packet 140. Likewise, if the TSTS server 110 determines that the TSTS client 130 is not having problems receiving a continuous stream of source multimedia content S, the TSTS client 130 can switch off transmission of transcoded multimedia content T altogether.

To set a baseline for a particular TSTS client 130, the TSTS server 110 can, in response to a request for source multimedia content S, perform a test to determine latencies for communications between the TSTS server 110 and the particular TSTS client 130. For longer latencies, the TSTS server 110 can set the degree of transcoding of source multimedia content S to a larger degree and/or staggering of times between the source multimedia content S 144 and the transcoded multimedia content T 146 by a larger amount of time. Higher degrees of transcoding and/or larger time staggering between the source multimedia content S 144 and the transcoded multimedia content T 146 results in higher degrees of protection at the TSTS client 130 against interruptions in a multimedia experience of a user.

Figure 3:
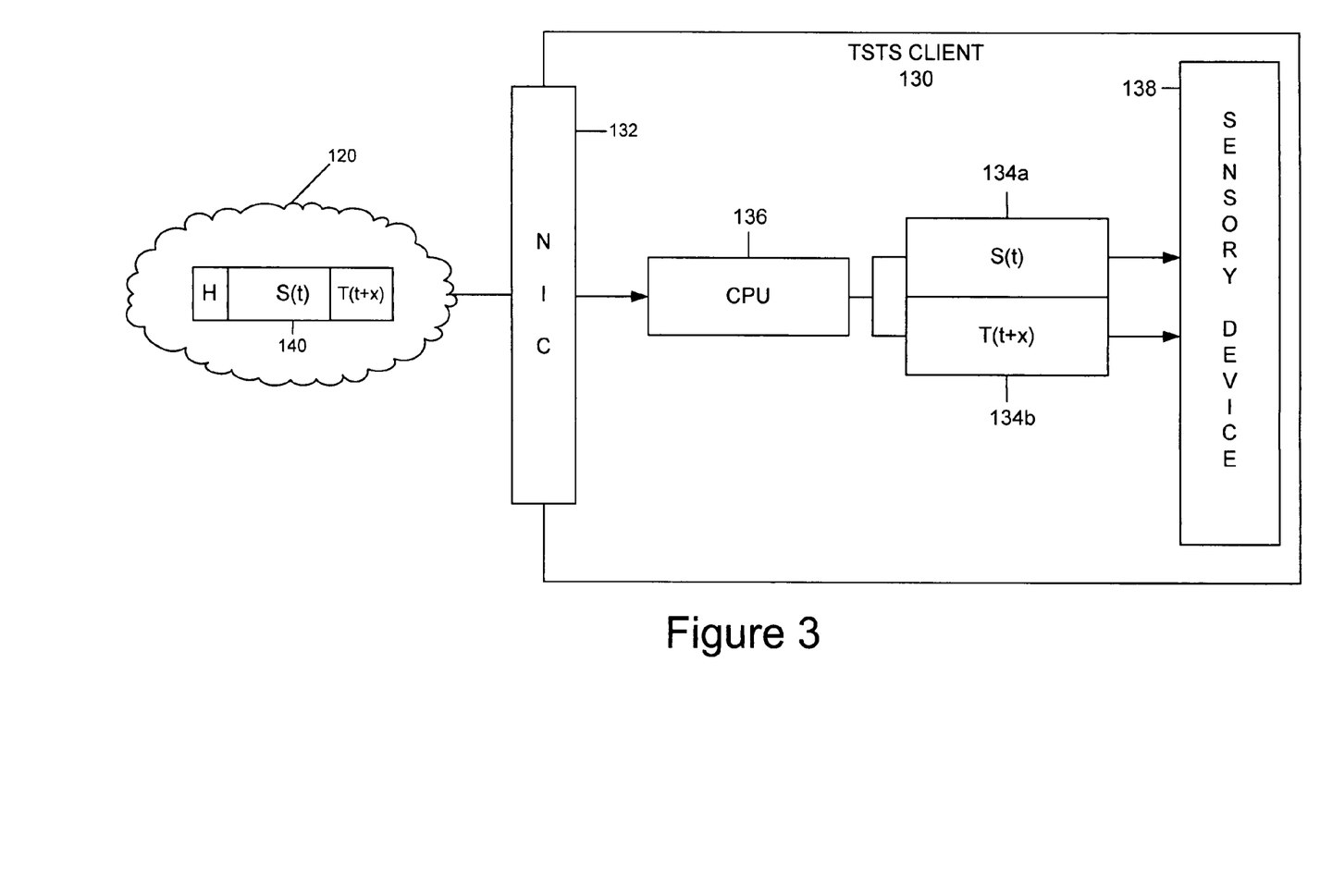
FIG. 3 shows a TSTS client, in accordance with the principles of the present invention.

FIG. 3 shows a TSTS client, in accordance with the principles of the present invention.

In particular, the TSTS client 130 includes a NIC 132, a source multimedia content S input buffer 134a, a transcoded multimedia content T input buffer 134b, a CPU 136, and a sensory device 138.

The TSTS data packet 140 can be received by the TSTS client 130 from data network 120. The NIC 132 performs low levels functions for allowing the TSTS client 130 to communicate with the data network 120, as is known within the art.

The CPU 136 selectively moves contents of the TSTS data packet 140 to either the source multimedia content S input buffer 134a and the transcoded multimedia content T input buffer 134b. The CPU 136 analyzes the TSTS data packet 140 to determine if its payload contains transcoded content. The CPU 136 stores the source multimedia content S 144 from the TSTS data packet 140 in the source multimedia content S input buffer 134a. The CPU 136 stores transcoded multimedia content T 146 from the TSTS data packet 140 in the transcoded multimedia content T input buffer 134b.

The CPU 136 continuously monitors the status of the source multimedia content S input buffer 134a. If the source multimedia content S input buffer 134a contains source multimedia content S, that source multimedia content transferred to the sensory device 138 for display to a user. If the source multimedia content S input buffer 134a becomes depleted, the CPU 136 switches to instead rely on content from the transcoded multimedia content T input buffer 134b. This switching of sources causes the transcoded multimedia content T from the transcoded multimedia content T input buffer 134b to be transferred to the sensory device 138. In this manner, the CPU 136 can continuously provide a multimedia stream to the sensory device 138 by relying on multimedia content from both the source multimedia content S input buffer 134a and the transcoded multimedia content T input buffer 134b, allowing for an uninterrupted multimedia experience to the user.

The preferred embodiment disclosed herein maintains a constant time segment of transcoded multimedia content T in transcoded multimedia content T input buffer 134b. In the example above, 4 seconds of running transcoded multimedia content T is maintained in the transcoded multimedia content T input buffer 134b. Transcoded multimedia content T is continuously purged from the transcoded multimedia content T input buffer 134b as new transcoded multimedia content T is added to the transcoded multimedia content T input buffer 134b. In this manner, the transcoded multimedia content T input buffer's 134b available content is matched to the source multimedia content S that is being viewed by a user. The transcoded multimedia content T is instantaneously available in the event that the source multimedia content S input buffer 134a becomes depleted.

Alternately, transcoded multimedia content T can be transmitted from the TSTS server 110 and stored on the TSTS client 130 well in advance of the TSTS client 130 needing such transcoded multimedia content T. Transcoded multimedia content T can be transmitted to the TSTS client 130 as the TSTS client 130 is experiencing the source multimedia content S from the source multimedia content S input buffer 134a. Once the transcoded multimedia content T input buffer 134b becomes full, all available bandwidth from TSTS server 110 can be dedicated for transmission of the source multimedia content S to the source multimedia content S input buffer 134a.

Sensory device 138 can include any of a video display, a speaker, and both a video display and a speaker. The type of sensory device 138 employed in TSTS client 130 is dependent upon the particular type of TSTS client 130 being employed with the embodiments disclosed herein. Applying the embodiments disclosed herein to a cellular telephone 530a, a personal computer 530b, and a satellite television receiver 530c would result in sensory device 138 including both a video display and a speaker. Applying the embodiments disclosed herein to a satellite radio receiver 530d would result in sensory device 138 including just a speaker. In certain applications though, sensory device 138 can include only a video display.

Figure 4A:
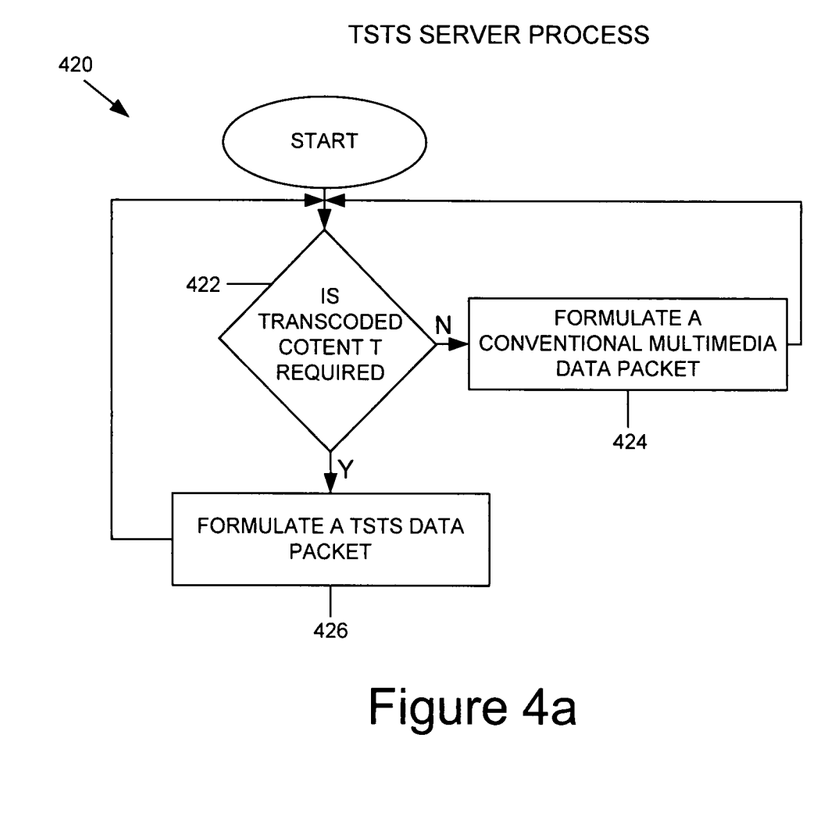
FIG. 4a shows a TSTS server process by which a TSTS server passes multimedia content to the data network, in accordance with the principles of the present invention.

FIG. 4a shows a TSTS server process by which a TSTS server passes multimedia content to the data network, in accordance with the principles of the present invention.

In step 422, a determination is made if a TSTS server 110 should include transcoded multimedia content T in a data packet leaving the TSTS server 110. As discussed above, the TSTS server 110 can communicate with the TSTS client 130 to determine latencies associate with communications between the two devices. Thereafter, the TSTS server 110 can communicate with the TSTS client 130 to determine if the TSTS client 130 is experiencing interruptions to its multimedia experience. Depending upon how large the latencies are and/or if the TSTS client 130 is experiencing interruptions to its multimedia experience, the TSTS server 130 can transmit either a conventional multimedia packet or, in accordance with the principles disclosed herein, the TSTS data packet 140 disclosed herein. If the CPU 113 determines that the TSTS server 110 should transmit transcoded multimedia content T, step 422 branches to step 426. Otherwise, if the CPU 113 determines that the TSTS server 110 should not transmit transcoded multimedia content T, step 422 branches to step 424.

In an alternately embodiment, step 422 and step 424 can be eliminated altogether, with the TSTS server process 420 automatically and continuously performing step 426 to formulate the TSTS data packet 140 disclosed herein and provide multimedia content to the TSTS client 130.

In step 424, TSTS server 110 formulates a conventional multimedia data packet that lacks the transcoded multimedia content T disclosed herein.

In step 426, TSTS server 110 formulates a TSTS data packet 140 that includes both the source multimedia content S 144 and the transcoded multimedia content T 146 disclosed herein.

Irrespective of which branch is taken, i.e., step 424 or step 426, to pass a data packet to the client device 130, both step 424 and step 426 branch back to decision step 422. In this manner, the TSTS server 130 continuous determines if a conventional multimedia data packet or the TSTS data packet 140 disclosed herein should be transmitted to the TSTS client 130.

Figure 4B:
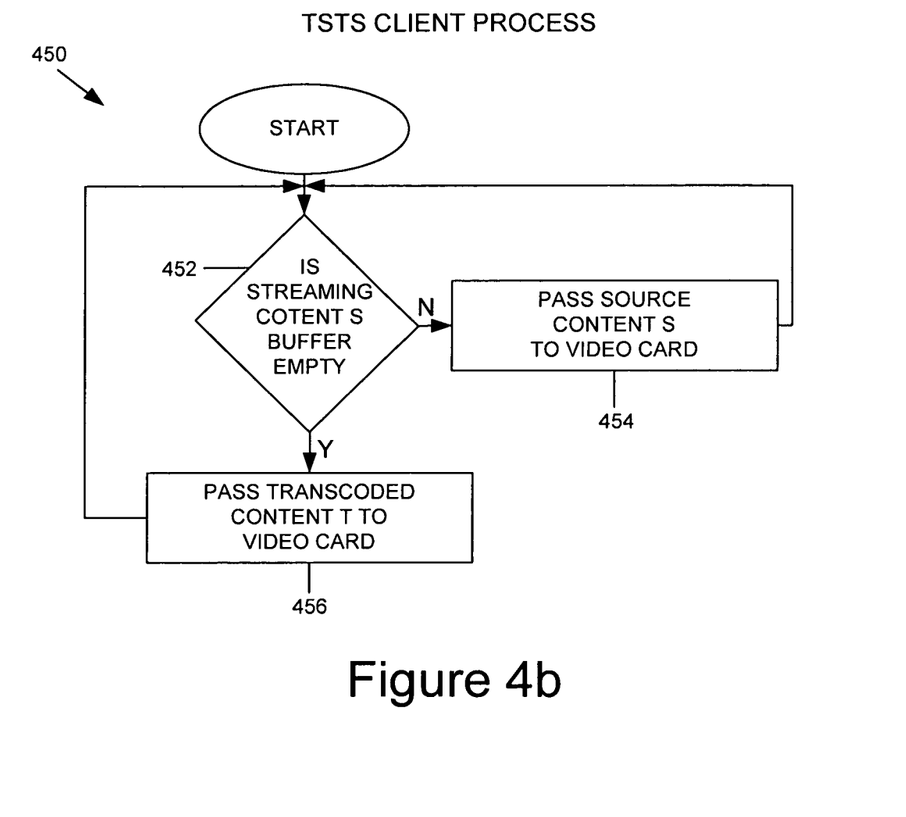
FIG. 4b shows a TSTS client process by which a TSTS client passes multimedia content to a sensory device, in accordance with the principles of the present invention.

FIG. 4b shows a TSTS client process by which a TSTS client passes multimedia content to a sensory device, in accordance with the principles of the present invention.

In step 452, a determination is made if the TSTS client's 130 source multimedia content S input buffer 134a is empty. As discussed above, the CPU 136 continuously monitors for a status of the source multimedia content S input buffer 134a. If the CPU 136 determines that the source multimedia content S input buffer 134a is not empty, i.e., that the source multimedia content S input buffer 134a contains source multimedia content S, step 452 branches to step 454. Otherwise, if the CPU 136 determines that the source multimedia content S input buffer 134a is empty, i.e., that the source multimedia content S input buffer 134a lacks source multimedia content S, step 452 branches to step 456.

In step 454, the content of the source multimedia content S input buffer 134a is transferred to the sensory device 138.

In step 456, the content of the transcoded multimedia content T input buffer 134b is transferred to the sensory device 138.

Irrespective of which branch is taken, i.e., step 454 or step 456, to pass multimedia content to the sensory device 138, both step 454 and step 456 branch back to decision step 452. In this manner, the TSTS client 130 continuous monitors the status of the source multimedia content S input buffer 134a to determine if the TSTS client 130 should switch to the lower quality multimedia content stored in the transcoded multimedia content T input buffer 134b. Switching to the lower quality multimedia content prevents or minimizes interruptions to the multimedia experience of a user.

While the invention has been described with reference to the exemplary embodiments thereof, those skilled in the art will be able to make various modifications to the described embodiments of the invention without departing from the true spirit and scope of the invention.

What is claimed is:

1. A method of transmitting multimedia content from a server to a client device, comprising:
   retrieving source multimedia content data;
   retrieving a transcoded version of said source multimedia content data, said transcoded version of said source multimedia content data being time shifted in advance with respect to said source multimedia content data; and
   simultaneously transmitting said source multimedia content data and said transcoded version of said source multimedia content data from said server to said client device;
   wherein said transcoded version of said source multimedia content data provides an alternate source, at said client device, of multimedia content when said source multimedia content data becomes unavailable.

2. The method of transmitting multimedia content from a server to a client device according to claim 1, wherein:
   said server is a proxy server retrieving said source multimedia content from a multimedia source server.

3. The method of transmitting multimedia content from a server to a client device according to claim 1, further comprising:
   transcoding, at said server, said source multimedia content data.

4. The method of transmitting multimedia content from a server to a client device according to claim 1, wherein:
   said simultaneous transmission includes reception of a Transport Control Protocol (TCP)/Internet Protocol (IP) data packet.

5. The method of transmitting multimedia content from a server to a client device according to claim 1, wherein:
   said client device is a cellular telephone.

6. A system for transmitting multimedia content from a server to a client device, comprising:
   a source multimedia retriever to retrieve source multimedia content data;
   a transcoded multimedia retriever to retrieve a transcoded version of said source multimedia content data, said transcoded version of said source multimedia content data being time shifted in advance with respect to said source multimedia content data; and
   a data packet transmitter to simultaneously transmit said source multimedia content data and said transcoded version of said source multimedia content data from said server to said client device;
   wherein said transcoded version of said source multimedia content provides an alternate source, at said client device, of multimedia content to provide an uninterrupted review of multimedia content associated with said source multimedia content and said transcoded version of said source multimedia content.

7. The system for transmitting multimedia content from a server to a client device according to claim 6, further comprising:
   a transcode retriever to retrieve said transcoded version of said source multimedia content data from a transcoded multimedia server.

8. The system for transmitting multimedia content from a server to a client device according to claim 6, wherein:
said simultaneous transmission includes reception of a User Datagram Protocol (UDP) data packet.

9. The system for transmitting multimedia content from a server to a client device according to claim 6, wherein:
said client device is a satellite television receiver.

10. The method of transmitting multimedia content from a server to a client device according to claim 6, wherein:
said client device is a satellite radio receiver.

11. A method of receiving multimedia content from a server at a client device, comprising:
simultaneously receiving, from said server, source multimedia content data and a transcoded version of said source multimedia content data, said transcoded version of said source multimedia content data being time shifted in advance with respect to said source multimedia content data; and
buffering, within a data buffer at said client device, said source multimedia content data and said transcoded version of said source multimedia content data;
wherein said transcoded version of said source multimedia content data provides an alternate source, at said client device, of multimedia content when said source multimedia content data becomes unavailable.

12. The method of receiving multimedia content from a server at a client device according to claim 11, further comprising:
storing said source multimedia content data in a first data buffer portion of said data buffer; and
storing said transcoded version of said source multimedia content data in a second data buffer portion of said data buffer.

13. The method of receiving multimedia content from a server at a client device according to claim 11, wherein:
said simultaneous reception includes reception of a Transport Control Protocol (TCP)/Internet Protocol (IP) data packet.

14. The method of receiving multimedia content from a server at a client device according to claim 11, wherein:
said simultaneous reception includes reception of a User Datagram Protocol (UDP) data packet.

15. The method of receiving multimedia content from a server at a client device according to claim 11, wherein:
said client device is a satellite radio receiver.

16. A system for receiving multimedia content from a server at a client device, comprising:
a data packet receiver to simultaneously receive, from said server, source multimedia content data and a transcoded version of said source multimedia content data, said transcoded version of said source multimedia content data being time shifted in advance with respect to said source multimedia content data;
a data buffer to buffer, within said client device, said source multimedia content data and said transcoded version of said source multimedia content data; and
a multimedia streamer to stream said source multimedia content data to a sensory device and stream said transcoded version of said source multimedia content data to said sensory device;
wherein said transcoded version of said source multimedia content data provides an alternate source, at said client device, of multimedia content when said source multimedia content data becomes unavailable.

17. The system for receiving multimedia content from a server at a client device according to claim 16, wherein:
said data buffer is comprised of a first data buffer portion and a second data buffer portion, said first data buffer portion storing said source multimedia content data and said second data buffer portion storing said transcoded version of said source multimedia content data.

18. The system for receiving multimedia content from a server at a client device according to claim 16, wherein:
said simultaneous reception includes reception of a Transport Control Protocol (TCP)/Internet Protocol (IP) data packet.

19. The system for receiving multimedia content from a server at a client device according to claim 16, wherein:
said simultaneous reception includes reception of a User Datagram Protocol (UDP) data packet.

20. The system for receiving multimedia content from a server at a client device according to claim 16, wherein:
said client device is a cellular telephone.

* * * * *